(12) United States Patent
Murahari et al.

(10) Patent No.: US 10,461,484 B2
(45) Date of Patent: Oct. 29, 2019

(54) ELECTRICAL OUTLET AND REMOVABLE POWER MODULE

(71) Applicant: EATON CORPORATION, Cleveland, OH (US)

(72) Inventors: Saivaraprasad Murahari, Peachtree City, GA (US); Nilesh Ankush Kadam, Pune (IN); Sushant Raut, Washim (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 126 days.

(21) Appl. No.: 15/655,370

(22) Filed: Jul. 20, 2017

(65) Prior Publication Data

US 2019/0027876 A1    Jan. 24, 2019

(51) Int. Cl.

| | |
|---|---|
| *H01R 13/635* | (2006.01) |
| *H01R 27/00* | (2006.01) |
| *H01R 13/74* | (2006.01) |
| *H01R 13/639* | (2006.01) |
| *H01R 13/502* | (2006.01) |
| *H01R 13/506* | (2006.01) |
| *H01R 24/62* | (2011.01) |
| *H01R 24/76* | (2011.01) |
| *H01R 13/66* | (2006.01) |
| *H02J 7/00* | (2006.01) |

(52) U.S. Cl.
CPC ........... *H01R 27/00* (2013.01); *H01R 13/502* (2013.01); *H01R 13/506* (2013.01); *H01R 13/635* (2013.01); *H01R 13/6395* (2013.01); *H01R 13/741* (2013.01); *H01R 13/748* (2013.01); *H01R 24/62* (2013.01); *H01R 13/6675* (2013.01); *H01R 24/76* (2013.01); *H02J 2007/0062* (2013.01)

(58) Field of Classification Search
CPC .. H01R 27/00; H01R 13/502; H01R 13/6395; H01R 13/6375; H01R 13/741; H01R 13/748; H01R 24/76; H01R 13/629; H01R 13/635
See application file for complete search history.

(56) References Cited

U.S. PATENT DOCUMENTS

| | | | | |
|---|---|---|---|---|
| 4,734,051 | A * | 3/1988 | Burns ................ | H01R 13/7036 439/289 |
| 7,104,814 | B1 * | 9/2006 | She .................... | H01R 13/4538 439/131 |
| 7,238,057 | B2 * | 7/2007 | Baranowski ........ | H01R 13/635 439/490 |

(Continued)

*Primary Examiner* — Felix O Figueroa
(74) *Attorney, Agent, or Firm* — Eckert Seamans Cherin & Mellott, LLC

(57) ABSTRACT

An electrical outlet that is structured to be mounted to a wall and to be electrically connected with an AC power source employs a removable and replaceable power module that includes its own USB power outlets. The electrical outlet includes a base having a receptacle formed therein within which the power module is receivable. The base additionally includes its own AC power outlets. The power module may include, for example, one or more USB power outlets, such as USB type-A outlets, and the power module can easily be removed and replaced with an alternative power module that includes, for example, one or more USB type-C power outlets.

17 Claims, 10 Drawing Sheets

(56) References Cited

U.S. PATENT DOCUMENTS

| | | | | |
|---|---|---|---|---|
| 7,986,141 B2* | 7/2011 | Feld | .................... | A61B 5/0555 |
| | | | | 324/318 |
| 9,837,813 B2* | 12/2017 | Newell | .................... | H02H 7/22 |
| 10,044,157 B2* | 8/2018 | Suri | ....................... | A47B 97/00 |
| 10,116,102 B2* | 10/2018 | Randall | .................... | H02G 3/12 |
| 10,175,996 B2* | 1/2019 | Byrne | ....................... | G04G 9/02 |
| 2009/0180261 A1* | 7/2009 | Angelides | ............. | H01H 83/04 |
| | | | | 361/747 |

* cited by examiner

ELECTRICAL OUTLET AND REMOVABLE POWER MODULE

BACKGROUND

Field

The disclosed and claimed concept relates generally to electrical outlets and, more particularly, to an electrical outlet that employs a removable and replacement power module having its own power outlet.

Related Art

Numerous types of electrical outlets are known in the relevant art. Electrical outlets are often mounted to a wall of a structure and include electrical connectors of various shapes that form AC power outlets that output AC power to electrical plugs of various forms, typically at 110 volts AC or 220 volts AC, by way of example, and are standardized on a country by country basis. The electrical plugs are electrically connected with electrical appliances in order to provide AC power to such electrical appliances. It is also known that certain electrical devices are powered by Universal Serial Bus (USB) connectors which typically operate at 5 volts DC. It has thus also been known to provide an electrical wall outlet that includes both an AC power outlet and a USB power outlet.

It is further known, however, that the USB standard continues to be developed. While, for example, the USB type-A connectors were well known in the early 2000s, other types of USB connectors, such as the USB type-C connector, has since gained popularity. As such, if an electrical outlet that is mounted to a wall provides both AC power outlets and USB power outlets, and if a user purchases a new device that employs a different USB connector than is provided on the installed electrical outlet, the user will be required either to replace the electrical outlet or to employ some type of converter in order to power the new USB device. Improvements thus would be desirable.

SUMMARY

Accordingly, an improved electrical outlet that is structured to be mounted to a wall and to be electrically connected with an AC power source employs a removable and replaceable power module that includes its own USB power outlets. The electrical outlet includes a base having a receptacle formed therein within which the power module is receivable. The base additionally includes its own AC power outlets. The power module may include, for example, one or more USB power outlets, such as USB type-A outlets, and the power module can easily be removed and replaced with an alternative power module that includes, for example, one or more USB type-C power outlets.

Accordingly, an aspect of the disclosed and claimed concept is to provide an electrical outlet of a type that can be electrically connected with an AC power source and which provides both one or more AC power outlets and one or more USB power outlets, with the USB power outlets being provided on a removable and replaceable power module.

Another aspect of the disclosed and claimed concept is to provide such an electrical outlet that employs a power module which is removable and replaceable with a different type of power module.

Another aspect of the disclosed and claimed concept is to provide such an electrical outlet that can be mounted on a wall of a structure such as a building.

Another aspect of the disclosed and claimed concept is to provide an electrical outlet that is capable of being used in conjunction with a removable and replaceable power module.

Another aspect of the disclosed and claimed concept is to provide an improved power module that is removably receivable on an electrical outlet.

Accordingly, an aspect of the disclosed and claimed concept is to provide an improved electrical outlet structured to be electrically connected with a line conductor and a neutral conductor of an AC power source and being further structured to be cooperable with a power module having a first electrical contact and a second electrical contact. The electrical outlet can be generally stated as including a base, an electrical apparatus situated on the base, the electrical apparatus can be generally stated as including a first connector, a second connector, a third connector, and a fourth connector, the base having a receptacle formed therein, the first connector and the second connector being situated one of at least partially inside the receptacle and adjacent the receptacle, the receptacle being structured to receive therein the power module with the first electrical contact being electrically connected with the first connector and with the second electrical contact being electrically connected with the second connector, and the third connector being electrically connectable with one of the line conductor and the neutral conductor, and the fourth connector being electrically connectable with the other of the line conductor and the neutral conductor.

Another aspect of the disclosed and claimed concept is to provide an improved power module that is structured to be cooperable with an electrical outlet which is electrically connected with a line conductor and a neutral conductor of an AC power source, the electrical outlet including a base having a receptacle formed therein, the electrical outlet further including an electrical apparatus that is situated on the base and that includes a first connector and a second connector that are electrically connected with the AC power source and that are situated one of at least partially inside the receptacle and adjacent the receptacle. The power module can be generally stated as including a housing, a first electrical contact, a second electrical contact, and a power outlet situated on the housing, the power outlet being electrically connected with the first and second electrical contacts, the power module being structured to be received in the receptacle with the first electrical contact being electrically connected with the first connector and with the second electrical contact being electrically connected with the second connector.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
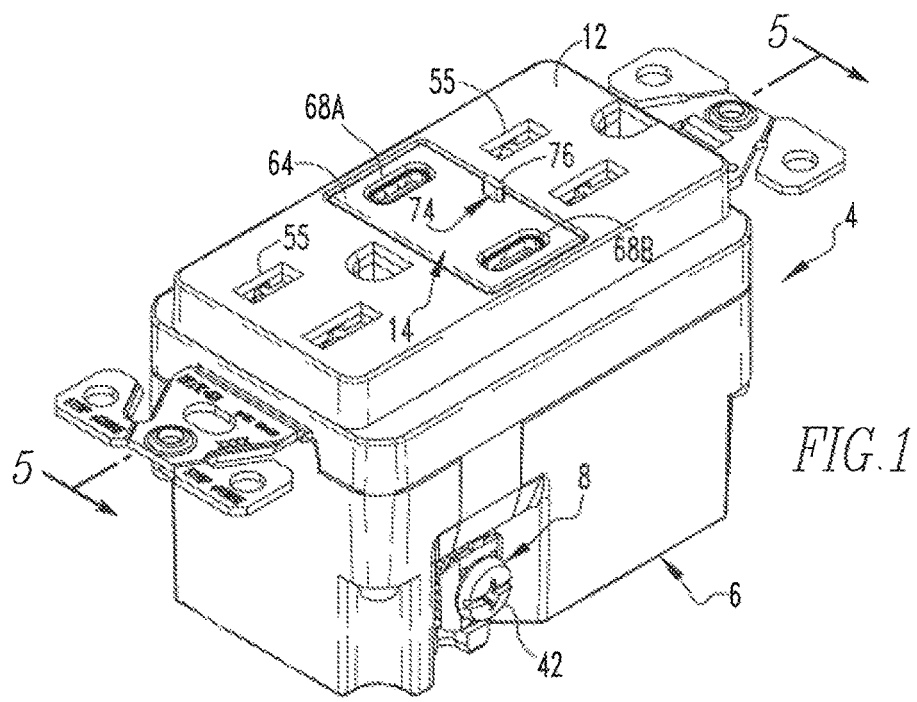
FIG. 1 is a perspective view of an improved electrical outlet in accordance with the disclosed and claimed concept.
Figure 2:
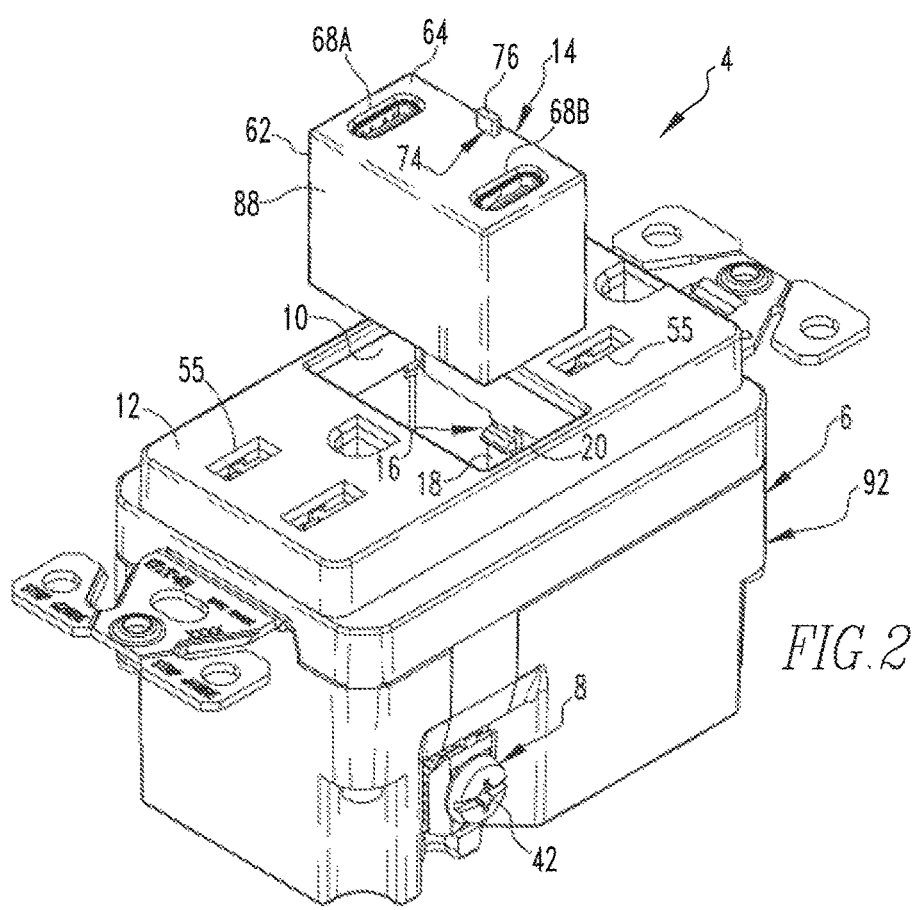
FIG. 2 is an exploded perspective view of the electrical outlet of FIG. 1.

An improved electrical outlet 4 in accordance with the disclosed and claimed concept is depicted in FIG. 1 in an assembled configuration and is depicted in FIG. 2 in an exploded configuration. The electrical outlet 4 can be said to include a base 6 upon which is situated an electrical apparatus 8. The base 6 has a receptacle 10 formed in an outer surface 12 of the base 6. The electrical apparatus 8 include a power module 14 that is receivable in receptacle 10 and is removable therefrom. As can be seen in FIG. 2, the electrical outlet 4 further includes a retention apparatus 16 that includes a support 18 that is situated on the base 6 and a latch 20 that is situated on the support 18. The support 18 is depicted in FIG. 2 as being in a free state wherein the latch 20 protrudes into the receptacle 10. The latch 20 in engageable with a corresponding structure on the power module 14 to retain the power module 14 inside the receptacle 10. The support 18 is deformable in a fashion that will be set forth in greater detail below to permit the power module 14 to be removed from the receptacle 10 and replaced with a different power module.

Figure 3:
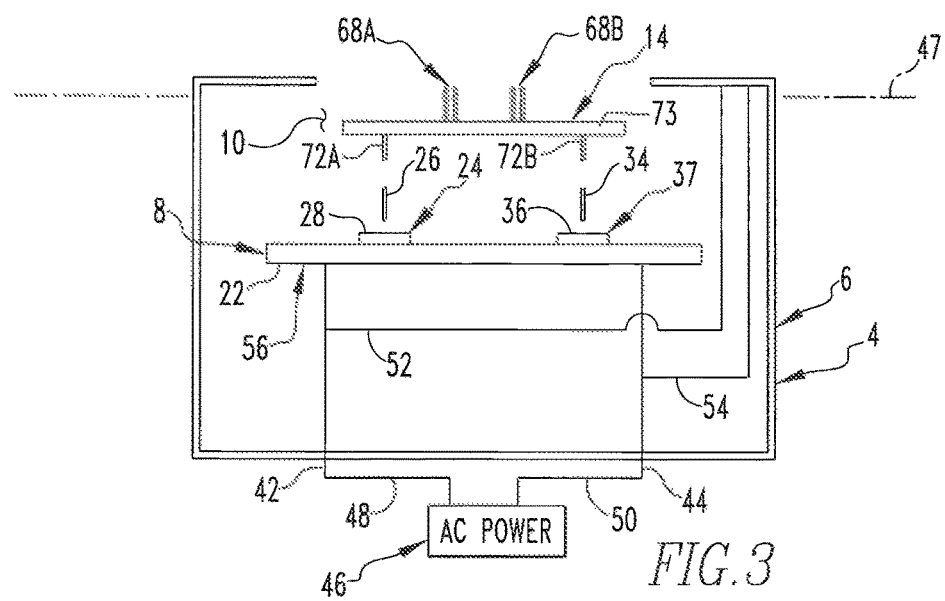
FIG. 3 is a schematic depiction of the electrical outlet of FIG. 1.

As can be understood from FIG. 3, the electrical apparatus 8 can be said to include, addition to the power module 14, a board 22, such as a printed circuit board or other board which has a first connector 24 connected therewith, and which further has connected therewith a second connector 32, a third connector 42, and a fourth connector 44. In the depicted exemplary embodiment, the first connector 24 can be said to include a first pin 26 and a first pad 28, with the first pad 28 being in the form of a conductor that is situated on the board 22. The first pin 26 is affixed to a first spring 30 (FIG. 12) that permits the first pin 26 to move with respect to the board 22 in a fashion that will be set forth in greater detail below. The second connector 32 likewise includes a second pin 34 that is affixed to a second spring 38 (FIG. 12) and further includes a second pad 36 in the form of a conductor that is affixed to the board 22. The first and second springs 30 and 38 can be said to form an ejection mechanism 40 of the electrical outlet 4 that ejects the power module 14 from the receptacle 10 in certain circumstances, such as will be described in greater detail below.

The electrical outlet 4 and, more particularly, the electrical apparatus 8, is intended to be electrically connected with an AC power source 46 and to be mounted to a wall 47, such as a wall of a building or the like. The AC power source 46 includes a line conductor 48 and a neutral conductor 50 and one or more ground conductors, and the like, all of which typically will be carried within the wall 47 for connection with the electrical apparatus 8. The third connector 42 is electrically connectable with the line conductor 48, and the fourth connector 44 is electrically connectable with the neutral conductor 50. The mounting of the electrical outlet 4 to the wall 47 typically will involve the physical mounting of an electrical box of some type to the wall 47 and the mounting of the electrical outlet 4 to the box, in a known fashion.

The electrical apparatus 8 further includes a line bus 52 that is electrically connected with the third connector 42 and a neutral bus 54 that is electrically connected with the fourth connector 44. The line bus 52 and the neutral bus 54 are situated within the base 6 adjacent openings that form a pair of AC power outlets 55 on the base 6.

The electrical apparatus 8 further includes a conversion apparatus 56 that is, in the depicted exemplary embodiment, situated on the board 22 and which includes hardware and/or software and/or firmware that converts the AC electricity that is received from the AC power source 46 via the third and fourth connectors 42 and 44 into 5 volts DC in order to serve as a source of DC power that is provided to the power module 14. It is understood that the conversion apparatus 56 could take any form that is capable of converting the AC power that is received from the AC power source 46 into 5 volts DC that can be output to the power module 14.

Figure 4:
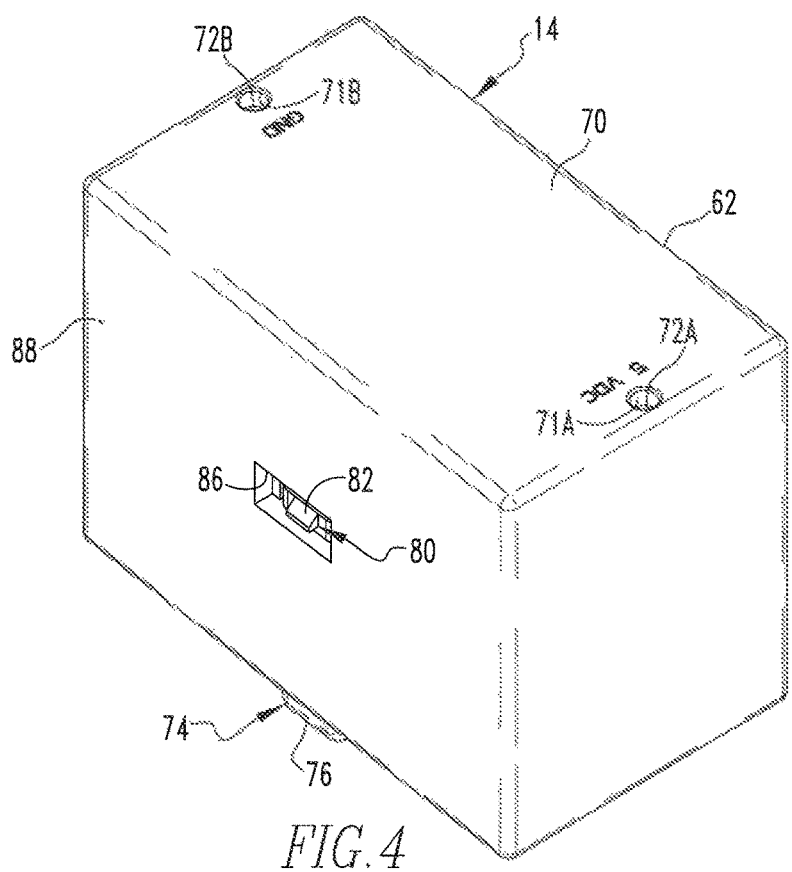
FIG. 4 is a perspective view of a power module of the electrical outlet of FIG. 1.

As can be understood from FIGS. 2 and 4, the power module 14 can be said to include a housing 62, and as can be seen in FIGS. 1 and 2 the housing 62 includes a frontal surface 64. As can be understood from FIGS. 1, 5, and 10, by way of example, the frontal surface 64 is flush with the outer surface 12 of the base 6 when the power module 14 is installed in the receptacle 10. The power module 14 includes a pair of power outlets 68A and 68B that are recessed into the frontal surface 64. In the depicted exemplary embodiment the power outlets 68A and 68B are each USB type-C ports.

As can be seen in FIG. 4, the housing 62 additionally includes a rear surface 70 opposite the frontal surface 64 and which has a pair of openings 71A and 71A formed therein. The power module 14 further includes a pair of electrical contacts 72A and 72B that are situated within the openings 71A and 71B that are spaced from the rear surface 70. The power outlets 68A and 68B are each electrically connected with both of the electrical contacts 72A and 72B. More specifically, the depicted exemplary power module 14 includes a board 73 upon which the electrical contacts 72A and 72B are situated and which provides the electrical connection between the electrical contacts 72A and 72B and each of the power outlets 68A and 68B.

Figure 5:
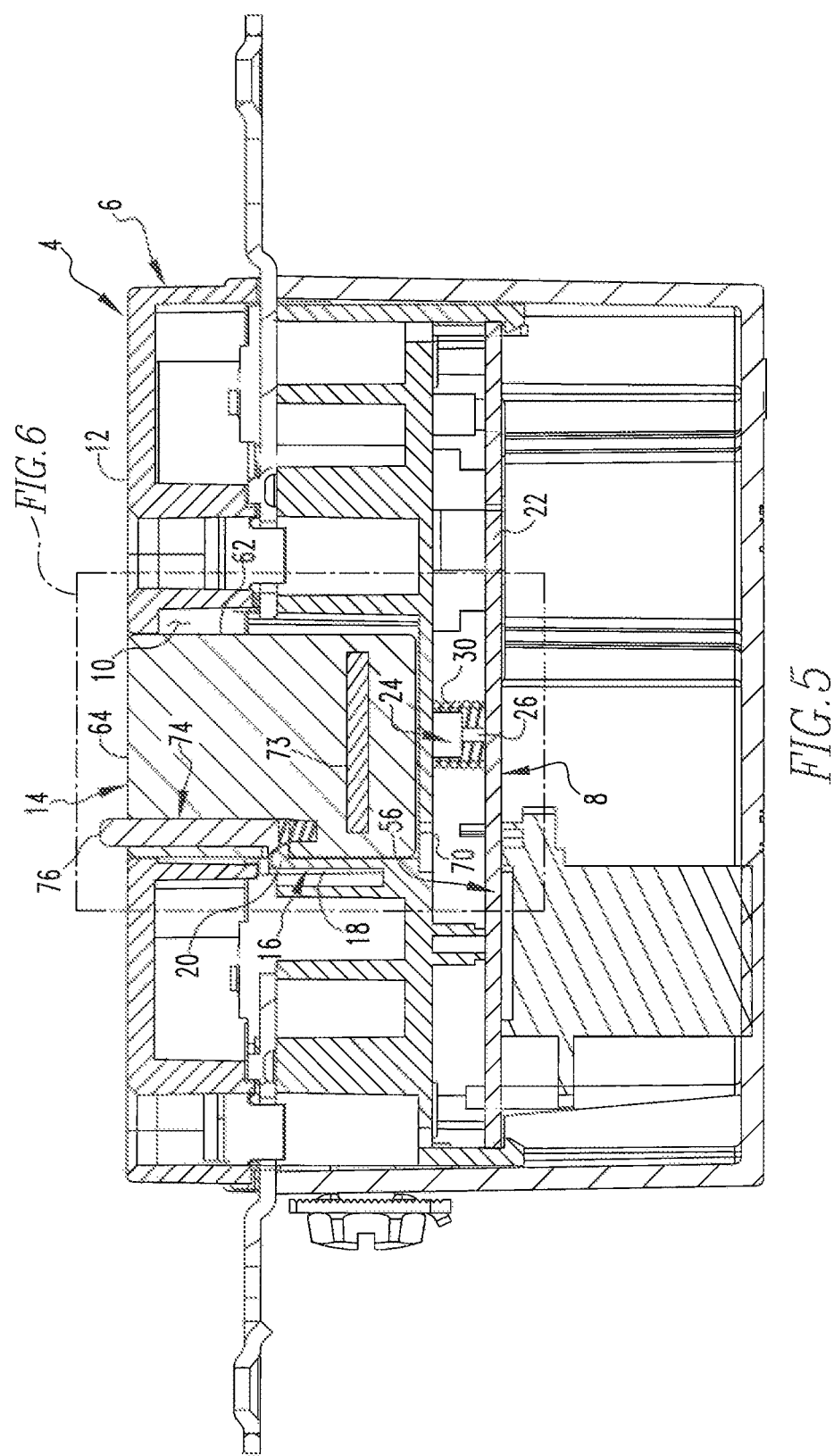
FIG. 5 is a sectional view as taken along line 5-5 of FIG. 1.
Figure 6:
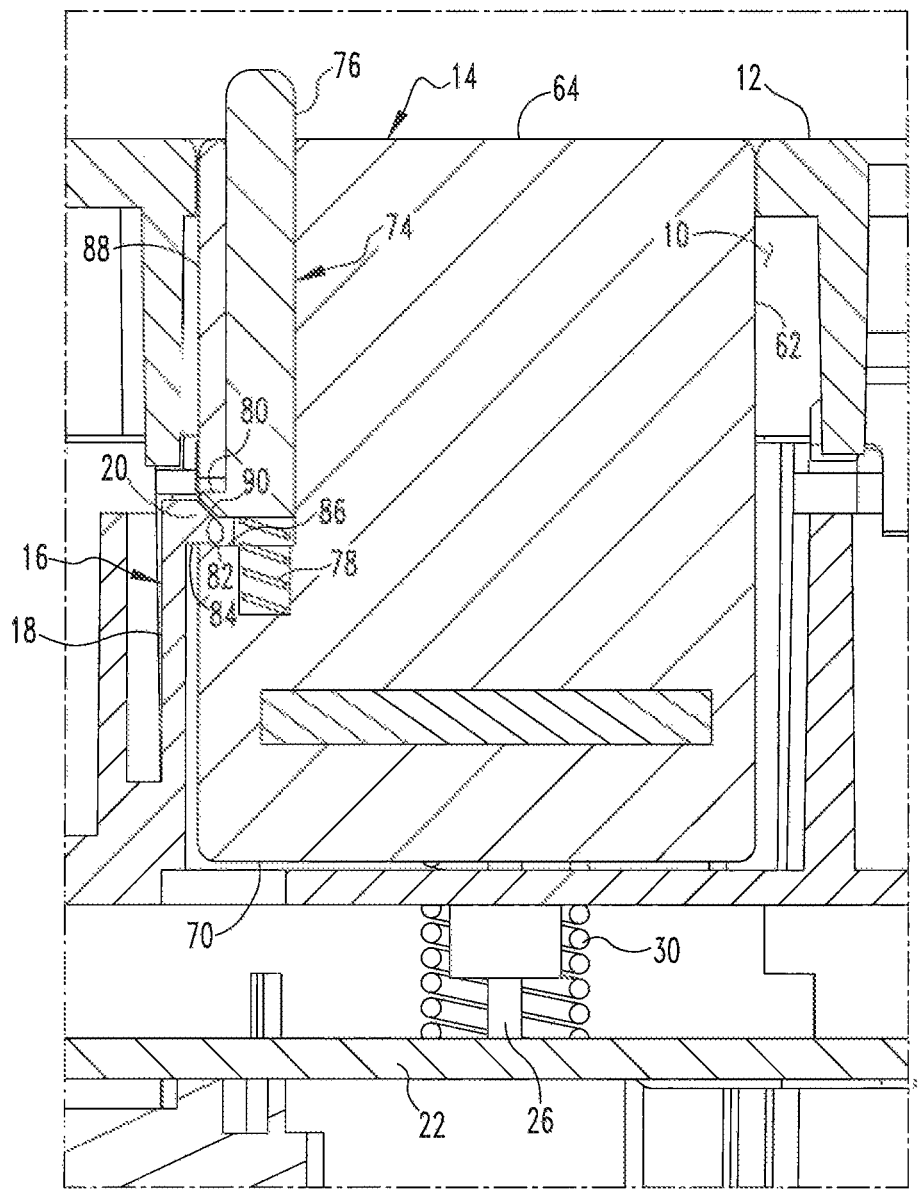
FIG. 6 is an enlargement of an indicated portion of FIG. 5.

As can be understood from FIGS. 4-7A, the power module 14 additionally includes a release mechanism 74 that is situated on the housing 62 and which is operable to disengage the retention apparatus 16 from the power module 14 in order to enable the power module 14 to be removed from the base 6. The exemplary release mechanism 74 includes an actuator 76 that is biased by a spring 78 toward the position in which the actuator 76 is depicted in FIG. 5, i.e., which is a biasing of the actuator 76 in the upward direction from the perspective of FIG. 5. The actuator 76 in the position depicted generally in FIG. 5 has a portion that protrudes outwardly from the frontal surface 64 and which can be manually engaged and pressed in a downward direction from the perspective of FIG. 5 to overcome the bias of the spring 78.

As can be seen in FIG. 5-7A, the actuator 76 further includes a cam 80 that is situated at an end of the actuator 76 opposite the portion that protrudes outwardly from the frontal surface 64B. The cam 80 has an engagement surface 82 that is oriented at an oblique angle with respect to the direction of travel of the actuator 76. As can be understood from FIG. 6, the latch 20 of the retention apparatus 16 includes a latching surface 84 that engages an edge 86 of the housing 62 of the power module 14 when the power module 14 is situated within the receptacle 10 and is installed on the base 6. The edge 86 is formed in a lateral surface 88 of the housing 62, it being noted that the lateral surface 88 extends generally between the frontal surface 64 and the rear surface 70. As can further be seen in FIGS. 6-7A, the latch 20 has a reaction surface 90 formed thereon. As can be understood from FIG. 6, the reaction surface 90 is of an oblique orientation with respect to the direction of travel of the actuator 76 that is complementary to the engagement surface 82.

FIG. 5 depicts the power module 14 installed on the base 6 with the latching surface 84 engaging the edge 86 of the power module 14 to retain the power module 14 within the receptacle 10. As can be understood from FIG. 7, however, when the actuator 76 is depressed as in the direction of the arrow 91 in order to overcome the bias of the spring 78, the engagement surface 82 compressively engages the reaction surface 90, which causes the latch 20 to move in the leftward direction from the perspective of FIG. 7 which, in turn, causes the support 18 to become elastically deformed to cause the latching surface 84 of the latch 20 to become disengaged from and to vertically clear the edge 86 of the housing 62. With the latching surface 84 having vertically cleared the edge 86, meaning that the latching surface 84 does not overlie the edge 86 in the vertical direction from the perspective of FIG. 7, the ejection mechanism 40 biases the power module 14 out of the receptacle 10 in generally the direction of the arrow 93 in FIG. 7A. The first and second springs 30 and 38 of the ejection mechanism 40 bias the housing 62 of the power module 14 in a direction generally out of the receptacle 10 and translate the power module 14 in the direction of the arrow 93 to cause the housing 62 to protrude from the outer surface 12 a distance sufficient to enable the power module 14 to be manually grasped and to be pulled the rest of the way out of the receptacle 10 to be fully removed from the base 6. By way of example, FIG. 11 depicts the base 6 with the power module 14 completely removed therefrom.

Figure 8:
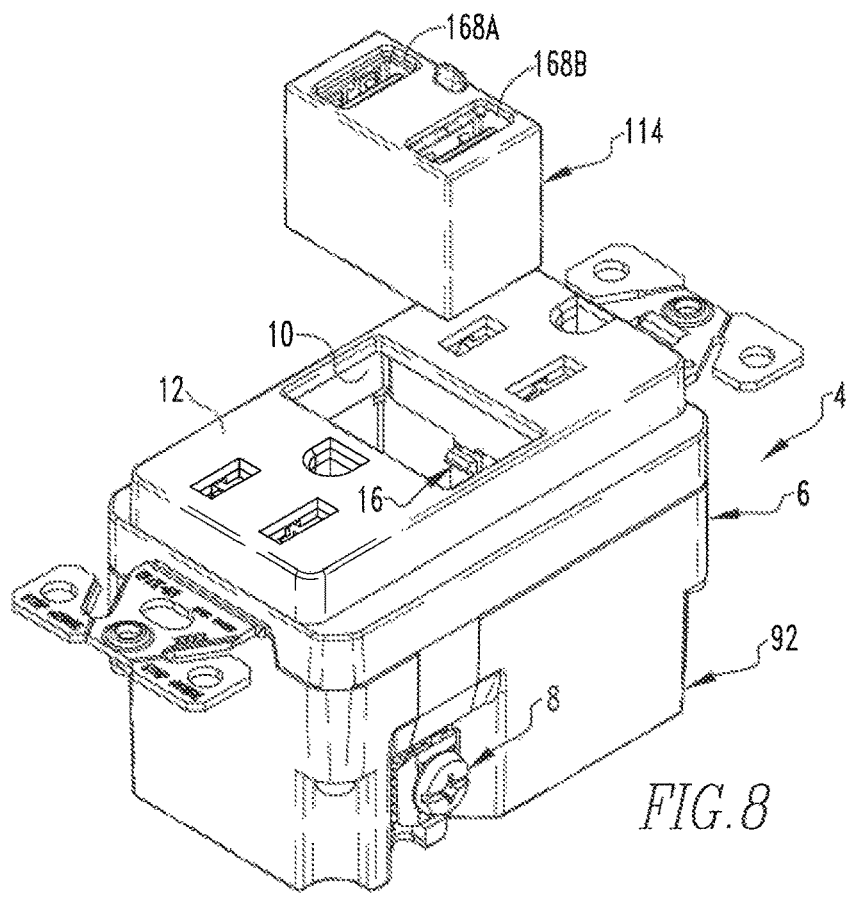
FIG. 8 is a perspective view of a different power module being received in the receptacle formed in the base.
Figure 9:
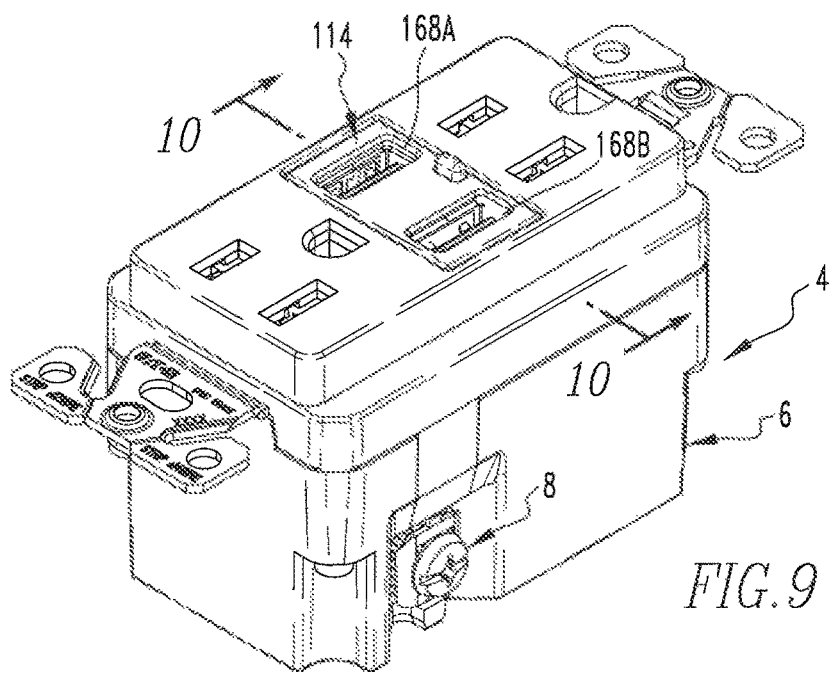
FIG. 9 is a perspective view of the electrical outlet with the different power module installed thereon.
Figure 11:
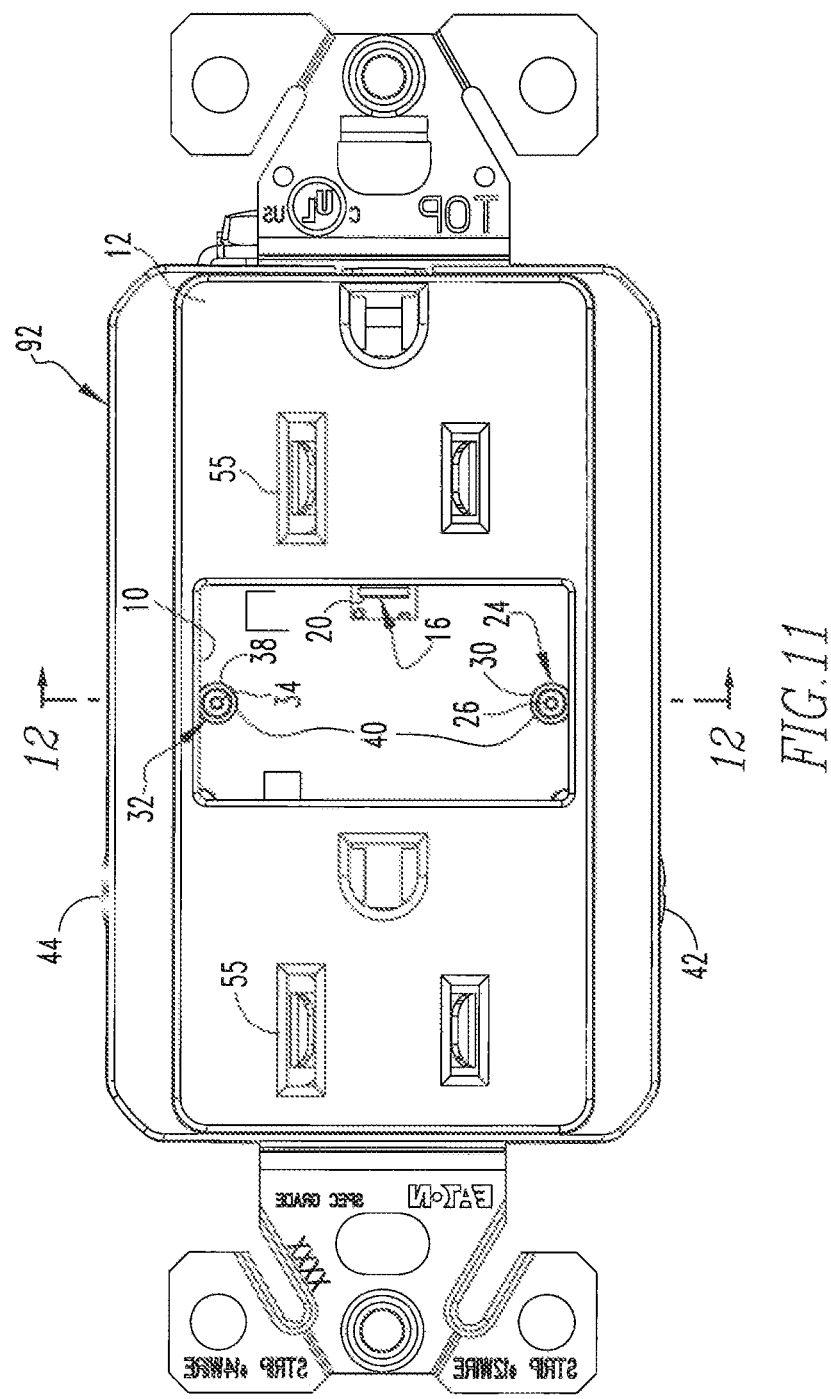
FIG. 11 is a top plan view of the base of the electrical outlet with the power module removed therefrom.

With the power module 14 completely removed from the base 6, as in FIG. 11, the portions of the base 6 that remain, meaning the base 6 plus the electrical apparatus 8 without the power module 14, can be referred to as being a base apparatus 92. The base apparatus 92 thus can receive in the receptacle 10 another power module 114, such as is indicated generally in FIG. 8. The exemplary power module 114 is essentially the same as the power module 14, except that the power module 114 has a pair of power outlets 168A and 168B that slightly different from the power outlets 68A and 68B in that the power outlets 168A and 168B are USB type-A power outlets. FIG. 9 depicts the power module 114 fully installed on the base apparatus 92 to form another configuration of the electrical outlet 4. Like the power module 14, the power module 114 has a frontal surface that is flush, with the outer surface 12 when the power module 114 is installed on the base 6.

It thus is understood that the power modules 14 and 114 can be alternatively installed on the base 6 to provide a pair of USB type-C power outlets of a pair of USB type-A power outlets, respectively, as needed. It is also understood that the power modules 14 and 114 are presented herein merely as being two examples of any of a wide variety of alternative power modules that can be received in the receptacle 10 and that can be thereby electrically powered by the 5 volt DC power output from the electrical apparatus 8. For example, an alternative power module might include a single USB type-A power outlet and a single USB type-C power outlet, by way of example, or that can include any of a wide variety of other types of USB power outlets or other types of power outlets that do not comply with the USB standard, without limitation, and in any combination. It is noted that the board 22 additionally has control electronics thereon which perform handshake operations and which charge USB Type-A or Type-C loads and devices, or other types of USB loads and devices, by way of example and without limitation. Such electronics may include micro-controllers, dedicated Type-A/C controllers along with simple analog circuitry.

Figure 7:
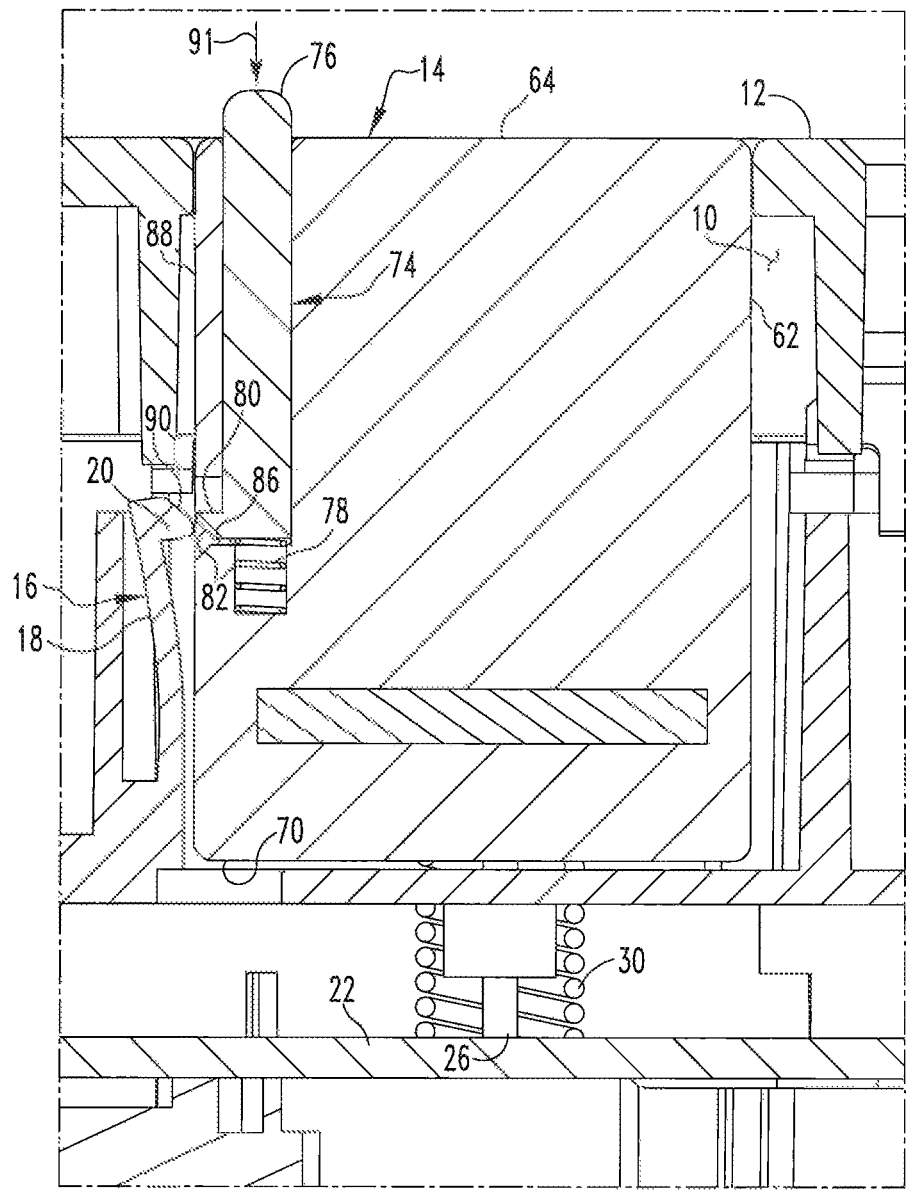
FIG. 7 is a view similar to FIG. 6, except depicting a release mechanism being actuated to permit removal of the power module from the electrical outlet.
Figure 7A:
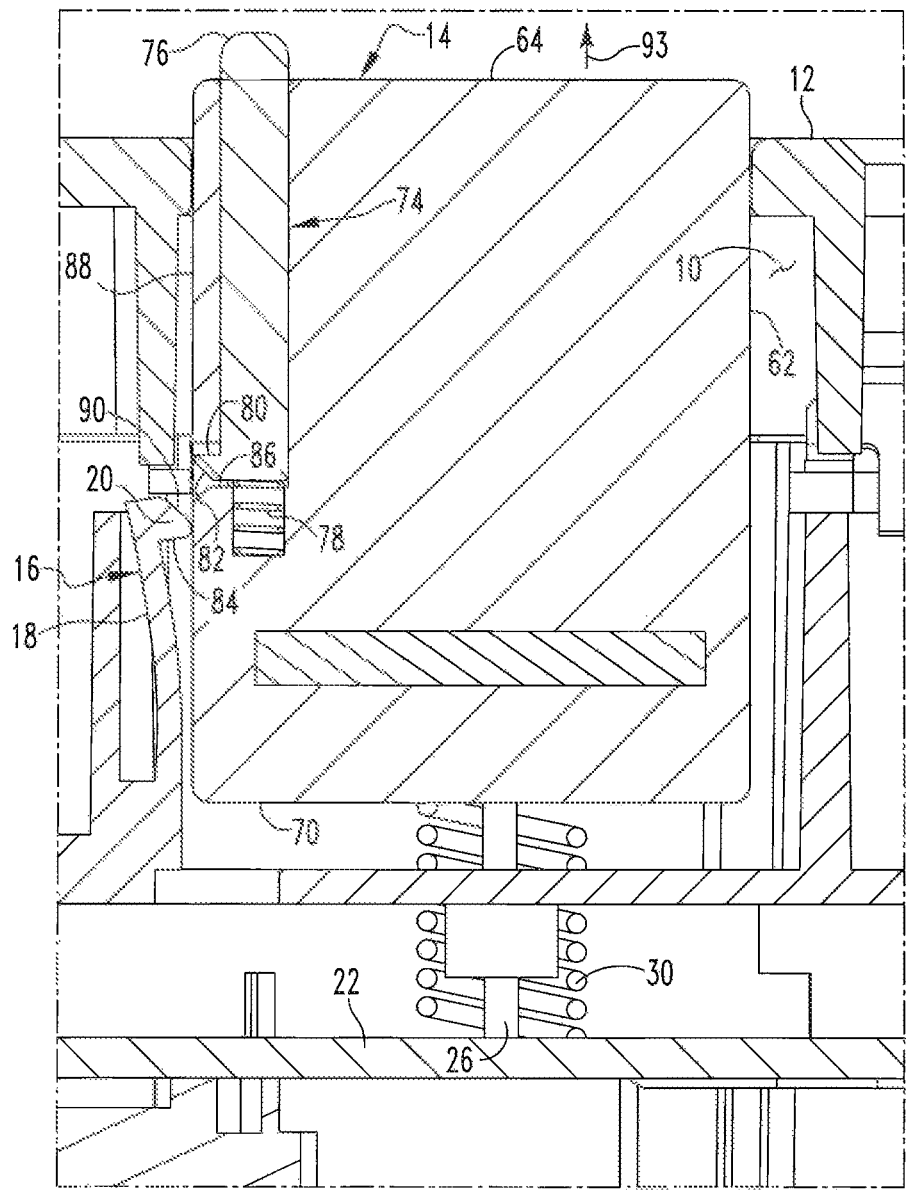
FIG. 7A is a view similar to FIG. 7, except depicting the power module being partially ejected from a receptacle formed on a base of the electrical outlet.
Figure 10:
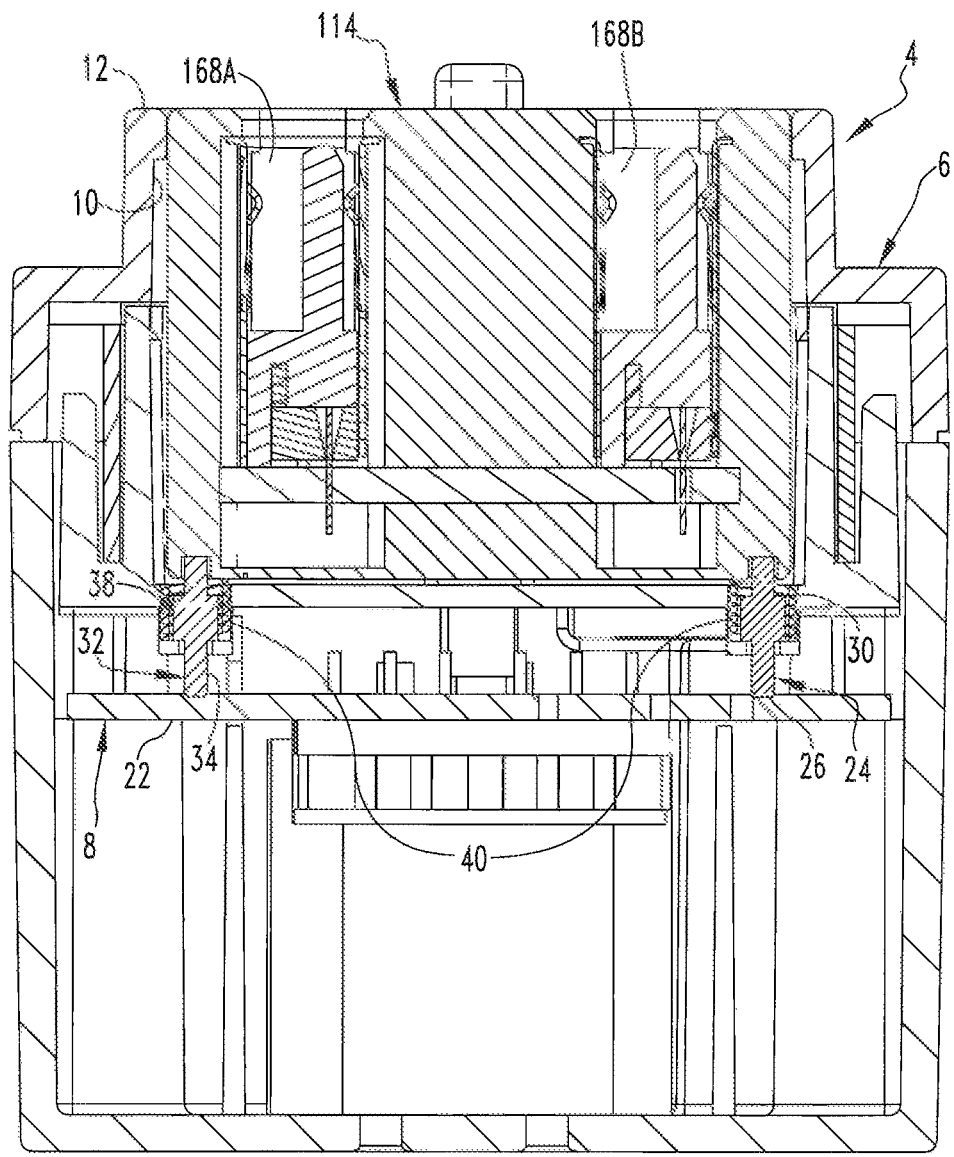
FIG. 10 is a sectional view as taken along line 10-10 of FIG. 9.

With further regard to FIGS. 10 and 11, it can be seen that when the power module 114 is received in the receptacle 10 and is mounted to the base 6 (or the power module 14 or any other cooperative power module), the first and second pins 26 and 38 are physically and electrically interposed between the electrical contacts 72A and 72B, respectively, and the first and second pads 28 and 36, respectively. The first and second pins 26 and 36 thus electrically conduct the 5 volts DC electrical output from the conversion apparatus 56 to the power module 14, and it thus can also be seen that the electrical contacts 72A and 72B in such a fashion are electrically connected with the third and fourth connectors 42 and 44, albeit via the conversion apparatus 56 of the electrical apparatus 8. In such a physical situation, the first and second springs 30 and 38 are in a compressed condition engaged with the rear surface 70 and biasing the power module 14 in the direction of the arrow 93, except that the latching surface 84 of the latch 20 is engaged with the edge 86 of the housing 62 of the power module 14, which results in the power module 14 being retained in the receptacle 10. However, when the actuator 76 is actuated to cause the latching surface 84 of the latch 20 to become disengaged from the edge 86 of the housing 62, such as is depicted in FIG. 7, the bias of the first and second springs 30 and 38 against the rear surface 70 causes the housing 62 and thus the power module 14 to be at least partially ejected from the retention apparatus 16, as in FIG. 7A. The first and second springs 30 and 38 eject the power module 14 out of the outer surface 12 a distance sufficient to enable the power module 14 to be manually grasped and removed the rest of the way from the receptacle 10, to result in the situation depicted generally in FIG. 12.

Figure 12:
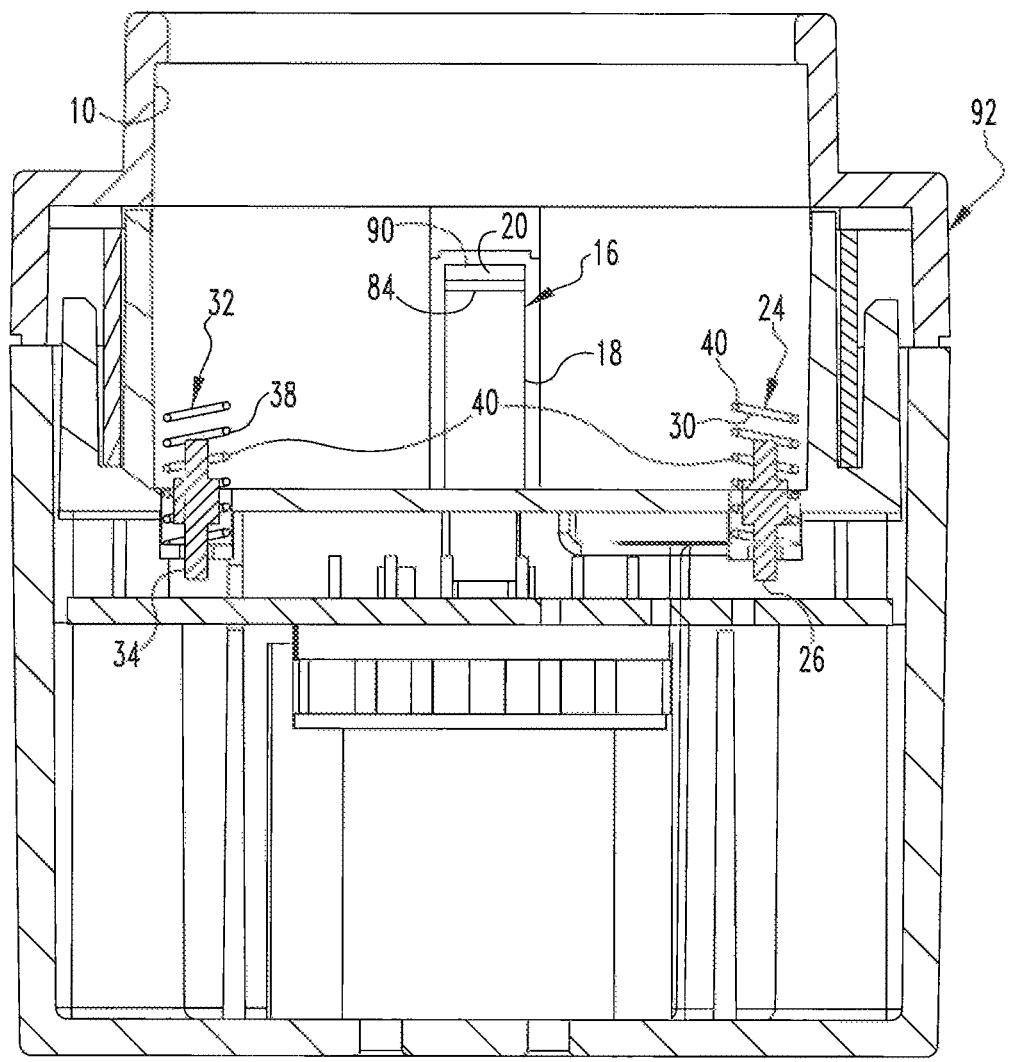
FIG. 12 is a sectional view as taken along line 12-12 of FIG. 11.

As can be seen in FIG. 12 wherein the power module 14 has been removed from the receptacle 10, the first and second pins 26 and 34 remain disposed on the first and second springs 30 and 38, respectively, but in such condition the first and second pins 26 and 34 are spaced from the first and second pads 28 and 36, respectively. When the power module is removed from the receptacle 10 therefore, the first and second pins 26 and 34 become de-energized inasmuch as they are removed from electrical connection with the first and second pads 28 and 36. It thus can be understood that the mounting of the first and second pins 26 and 34 on the first and second springs 30 and 38, respectively, enables the first and second pins 26 and 34 to be movable between a first configuration, such as is depicted generally in FIG. 10, wherein the first and second pins 26 and 34 are physically and electrically interposed between the electrical contacts 72A and 72B and the first and second pads 28 and 36, and a second position, such as is depicted generally in FIG. 12, where the first and second pins 26 and 34 are spaced from the first and second pads 28 and 36, respectively, and are electrically disconnected therefrom. It can be seen that in the second position of FIG. 12, the first and second pins 26 and 34 remain situated on the first and second springs 30 and 38, respectively. In FIG. 12, the first and second springs 30 and 38 remain situated on the base 6 but are in their free state protruding into the receptacle 10. In such condition, the first and second pins 26 and 34 remain situated in the receptacle 10 but are electrically de-energized, thereby avoiding a safety risk. When the power module 14 or 114 (or another power module) is received in the receptacle 10, the first and second pins 26 and 34 are returned to the first position of FIG. 10 to provide 5 volts DC electrical power to the power module. Other variations will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical outlet structured to be electrically connected with a 1 doctor and a neutral conductor of an AC power source, the electrical outlet comprising:
   a base;
   an electrical apparatus situated on the base;
   the electrical apparatus comprising a first connector, a second connector, a third connector, and a fourth connector;
   the base having a receptacle formed therein, the first connector and the second connector being situated inside the receptacle, the receptacle being structured to receive therein the power module with the first electrical contact being electrically connected with the first connector and with the second electrical contact being electrically connected with the second connector; and
   the third connector being electrically connectable with one of the line conductor and the neutral conductor, and the fourth connector being electrically connectable with the other of the line conductor and the neutral conductor;
   the electrical apparatus also comprising a power module having a first electrical contact, a second electrical contact, and a power outlet electrically connected with the first and second electrical contacts, the power module being receivable in the receptacle with the first electrical contact being electrically connected with the first connector and with the second electrical contact being electrically connected with the second connector; and
   the electrical apparatus further comprising a pair of springs situated on the base and additionally comprising a pair of electrical conductors that are electrically connected with the third and fourth connectors, the first and second connectors being situated on the pair of springs, the first and second connectors being movable on the pair of springs with respect to the base from a first position wherein the first and second connectors are interposed between and are electrically connected between the pair of electrical conductors and the first and second electrical contacts when the power module is fully received in the receptacle to a second position wherein the first and second connectors are biased by the pair of springs away from the pair of electrical conductors and are electrically disconnected therefrom after the power module has been removed from the receptacle.

2. The electrical outlet of claim 1 wherein the electrical apparatus further comprises a conversion apparatus electrically connected with the first connector, the second connector, the third connector, and the fourth connector, the conversion apparatus being structured to receive AC power from the third and fourth connectors and to output DC power to the first and second connectors.

3. The electrical outlet of claim 1 wherein the base comprises a retention apparatus that is structured to engage the power module to retain the power module in the receptacle.

4. The electrical outlet of claim 3 wherein the retention apparatus is structured to releasably retain the power module in the receptacle.

5. The electrical outlet of claim 1 wherein the electrical apparatus further comprises a conversion apparatus electrically connected with the first connector, the second connector, the third connector, and the fourth connector, the conversion apparatus being structured to receive AC power from the third and fourth connectors and to output DC power to the first and second connectors, and wherein the power outlet comprises a Universal Serial Bus (USB) connector.

6. The electrical outlet of claim 1 wherein at least one of the base and the power module comprises a retention apparatus that is structured to retain the power module in the receptacle.

7. The electrical outlet of claim 6 wherein the retention apparatus is structured to releasably retain the power module the receptacle.

8. The electrical outlet of claim 6 wherein the power module has a housing, the first and second electrical contacts and the power outlet being situated on the housing, the housing having a frontal surface, the power outlet being recessed in the frontal surface, the frontal surface facing away from the receptacle when the power module is received in the receptacle.

9. The electrical outlet of claim 8 wherein the base has an outer surface, the receptacle be formed in the outer surface, at least a portion of the outer surface and at least a portion of the frontal surface being flush with one another when the power module is received in the receptacle.

10. The electrical outlet of claim 6 wherein the retention apparatus comprises a latch that is situated on one of the power module and the base and that is structured to engage the other of the power module and the base to retain the power module in the receptacle.

11. The electrical outlet of claim 10 wherein the retention apparatus comprises a release mechanism that s structured to disengage the latch from the other of the power module and the base to permit removal of the power module from the receptacle.

12. The electrical outlet of claim 11 wherein the retention apparatus further comprises an ejection mechanism that is structured to push the power module at least partially from the receptacle when the latch is disengaged from the other of the power module and the base.

13. The electrical outlet of claim 12 wherein the ejection mechanism comprises a biasing element that is interposed between base and the power module.

14. The electrical outlet of claim 1 wherein the base has at least one set of openings formed therein, and wherein the electrical apparatus further comprises at least one set of further electrical connectors that are situated in the at least one set of openings and that are electrically connected with the third and fourth connectors, the at least one set of further electrical connectors being structured to output AC power.

15. The electrical outlet of claim 1 wherein the power outlet is structured to output DC power as a Universal Serial Bus (USB) connector.

16. The electrical outlet of claim 8, wherein the housing comprises an edge that is cooperable with a retention apparatus of the electrical outlet which is structured to retain the power module in the receptacle.

17. The electrical outlet of claim 16 wherein the housing further comprising a release mechanism that is structured to disengage the edge from the electrical outlet to permit removal of the power module from the receptacle.

\* \* \* \* \*